Dec. 27, 1966 V. A. FALKENAU ET AL 3,293,737
PROCESS FOR MAKING MOLD FOR VACUUM-FORMING MATERIALS
Original Filed May 22, 1963 4 Sheets-Sheet 1

INVENTORS
VERNON A. FALKENAU
CARL W. CHURCH
BY
Kurt Shaffert
ATTORNEY

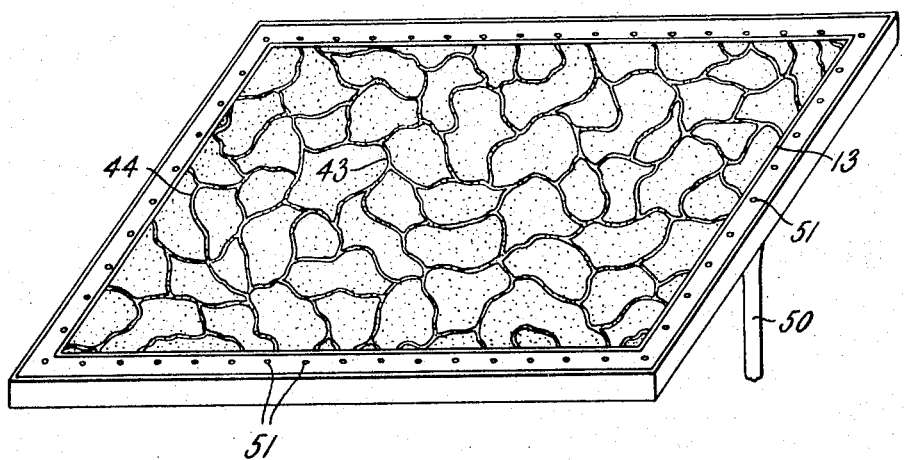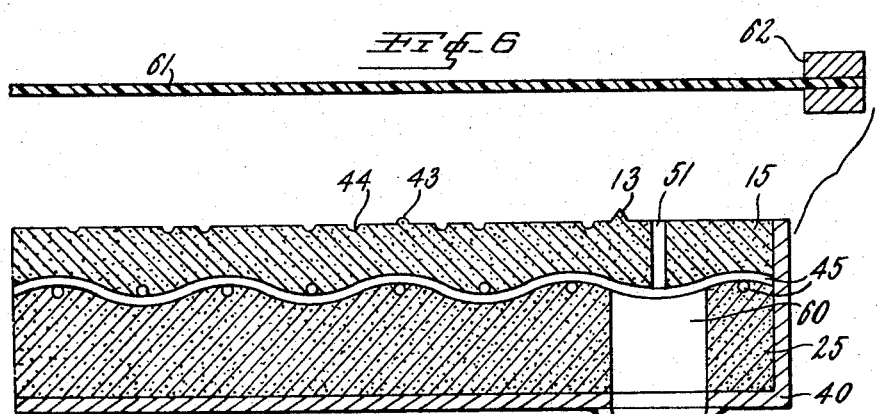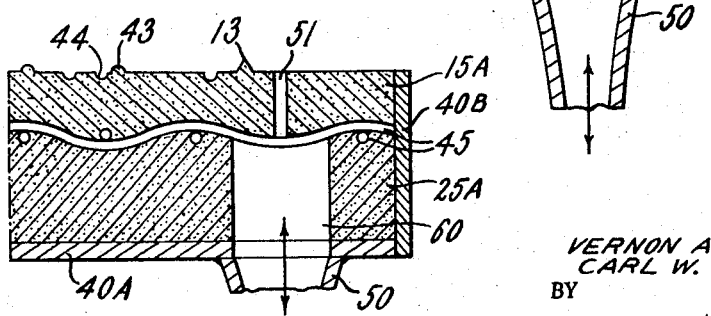

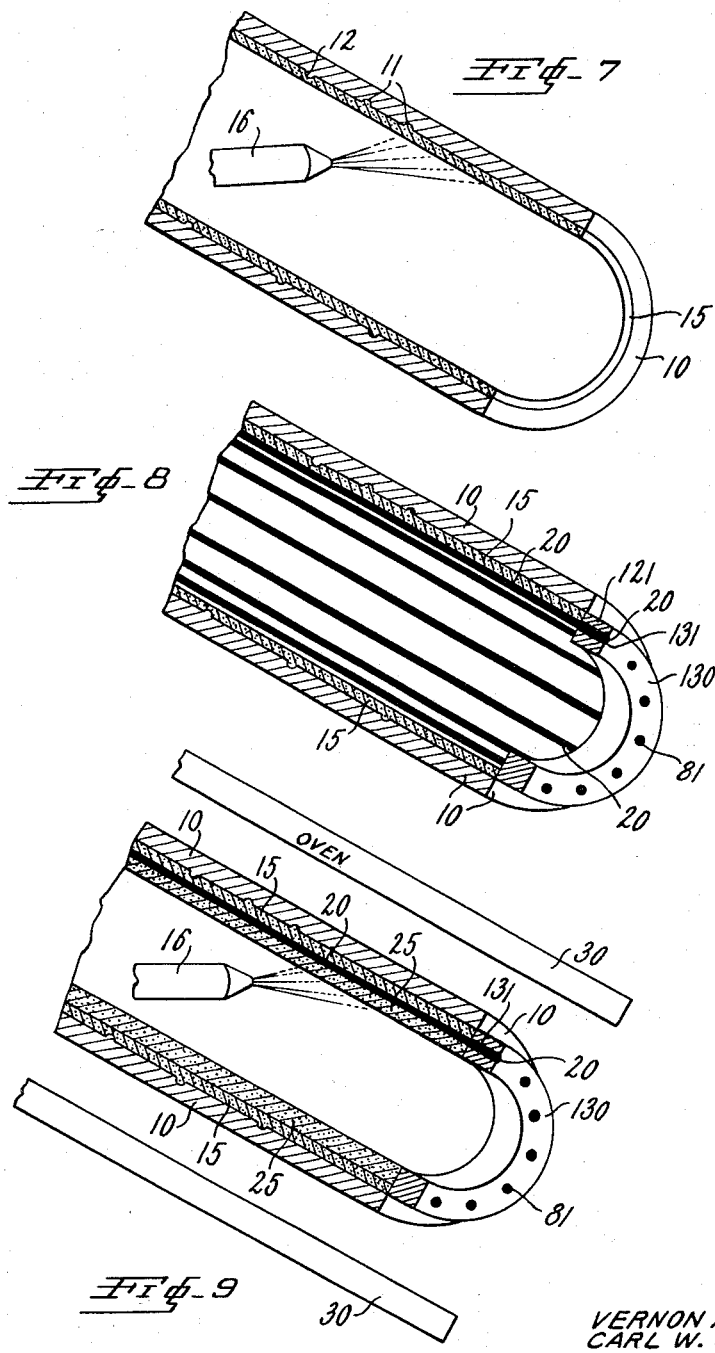

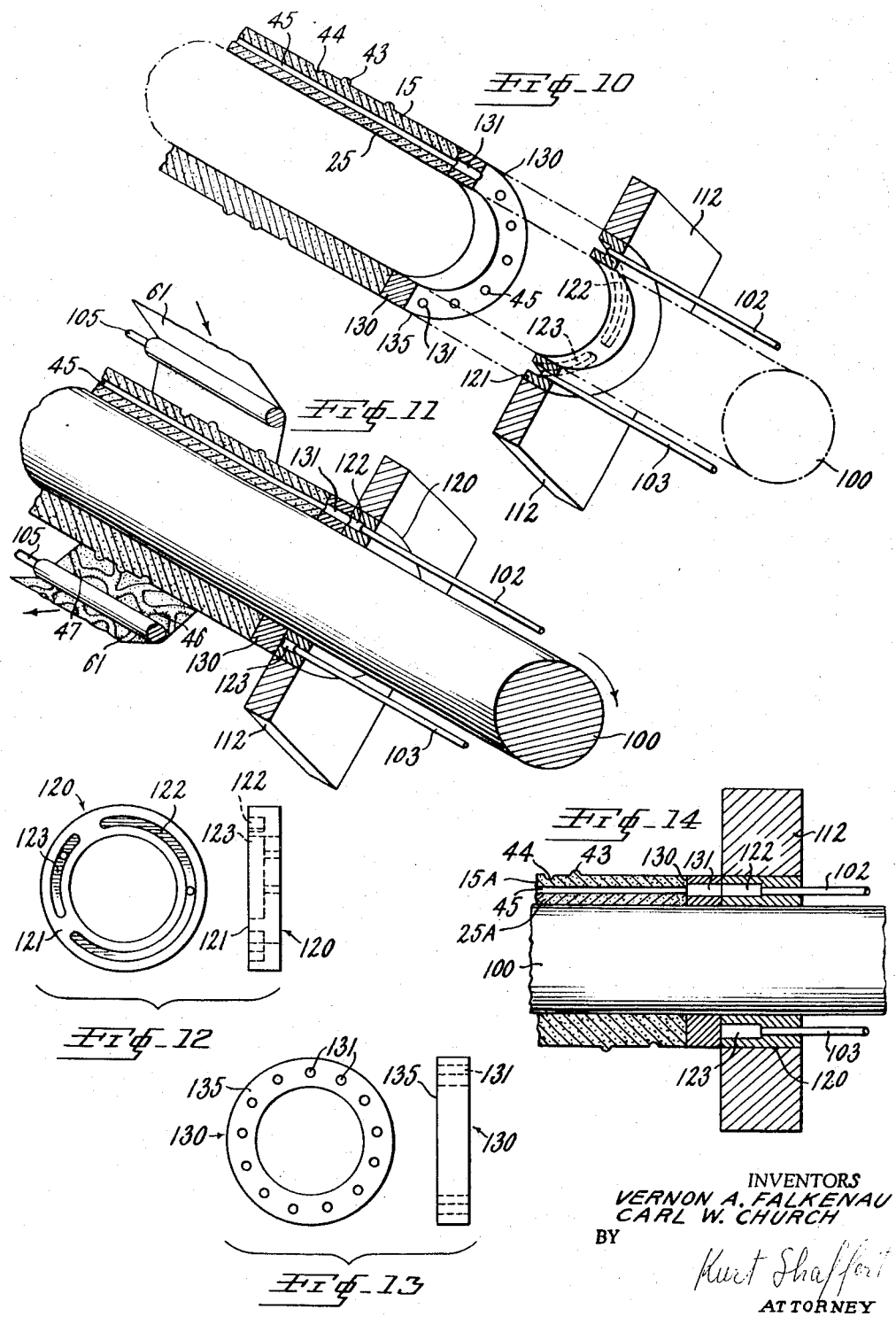

United States Patent Office 3,293,737
Patented Dec. 27, 1966

3,293,737
PROCESS FOR MAKING MOLD FOR VACUUM-FORMING MATERIALS
Vernon A. Falkenau and Carl W. Church, Mishawaka, Ind., assignors to United States Rubber Company, New York, N.Y., a corporation of New Jersey
Original application May 22, 1963, Ser. No. 282,443. Divided and this application Aug. 31, 1965, Ser. No. 484,043
3 Claims. (Cl. 29—423)

This application is a division of our copending application, Serial No. 282,443, filed May 22, 1963.

The present invention relates to a vacuum molding apparatus and a process for making the same, and more particularly concerns a low cost, lightweight porous metal mold for use in vacuum forming sheet materials.

The techniques and types of molds used in vacuum forming thermoplastic sheet materials are many and varied. In many vacuum forming operations, there is a definite problem in preventing or eliminating air entrapment between the surface of the hot, plastic sheet and the surface of the mold.

Many methods have been devised to overcome or minimize this problem, including the use of bleeder cords on the mold surface and small holes drilled in the mold surface. Each of these approaches has definite limitations and some disadvantages. Bleeder cords tend to cause lines which are visible in the final product. The use of small holes drilled in the mold surface is very expensive as a large number of holes are required over the entire mold surface for even partial effectiveness. Furthermore, especially when the sheet materials are being vacuum formed against a smooth or relatively smooth surface, these holes are visible, usually as a sprue, in the final product.

Recently, methods have been devised for making low cost porous metal structures through the use of techniques such as the spray metal technique. Some details of the construction and use of these porous metal structures as thermo-forming molds, as well as their advantages over the prior art, are described in Modern Plastics, vol. 39, No. 9, pp. 139 ff. (May 1962). The difficulty inherent in the use of porous metal molds stems largely from the fact that, in order to provide a high strength vacuum mold, the porous metal must be so thick as to seriously interfere with the rate of air flow through the porous metal structure, thereby reducing the vacuum to such a low value that the heated stock does not properly conform to the mold surface.

Presently, the molding or embossing of most thermoplastic sheet-like materials is done under pressure by means of pressure rolls, press plates, or vacuum bags. In all cases, the material is sandwiched between two surfaces and pressed to obtain the desired printed design from one or both surfaces. Again, the trapping of air in deep grooves or pockets of the design embossed on the stock is only one of numerous problems inherent in the technique, especially when very thin or expanded stock is being used. Other problems include the tendency of the hot stock to collapse while being passed through the nip of the rollers, the difficulty in maintaining accurate thickness gauge controls for complete and uniform embossing, tthe pulling and distortion of the fabric layer of a coated fabric as it passes through the pressure bite between nip rolls, the need for maintaining expensive back-up rolls, and the wasteful use of more material than is really necessary.

The present invention contemplates and has as its primary object the provision of a method for making a light weight, low cost porous metal vacuum mold offering both high structural strength and a high rate of air flow through the porous metal molding surface. It is a further object of this invention to provide a method for making a high strength porous metal vacuum mold in which the thickness of metal between the vacuum attachment and the heated stock is not so great as to interfere with the rate of air flow through the porous metal structure necessary to eliminate air entrapment between the surface of the hot plastic sheet and the surface of the mold.

It is still another principal object of this invention to provide a method for making porous metal vacuum rolls and plates which are of high strength and yet avoid the entrapment of air within any deep grooves and recesses of the stock.

Still another object of this invention is to provide a method for making porous metal vacuum embossing rolls which not only prevent the entrapment of air between the rolls and the material being embossed, but also have none of the disadvantages common to embossing systems in which the material to be embossed is sandwiched between two surfaces and pressed to obtain the desired imprinted design.

The objects of the present invention are achieved, briefly, by means of a porous vacuum mold comprising a composite of a first layer of porous metal and a second layer of metal, the two layers being partially in contact and partially separated by channels communicating with a vacuum source and all surfaces of the composite except for the molding surface of the first layer being covered with an air-impermeable sealer. The channels of the mold are formed by burning a combustible fiber between the two layers so as to leave open, distinct and well defined channels therebetween.

Other objects and advantages of the present invention can best be understood by a perusal of the following detailed description in conjunction with the drawings in which:

FIG. 5 is a perspective view of the finished mold and the texture of the top surface thereof;

FIG. 6 is a sectional front view of the finished mold and the thermoplastic sheet material to be molded;

FIG. 7 is a sectional perspective view showing the application of a first layer of porous metal on a "roll embodiment" mandrel;

FIG. 8 is a sectional perspective view of the structure of the fiber layer (of non-interconnected longitudinal fibers) over the first porous metal layer and its relation with a roll wing;

FIG. 9 is a sectional perspective view showing the application of a second layer of porous metal on top of the fiber layer prior to heating of the oven;

FIG. 10 is an axially exploded sectional perspective view of the finished mold mounted for rotation on a shaft;

FIG. 11 is a sectional perspective view of the finished mold in operation;

FIG. 12 is a front and top view of a commutator ring;

FIG. 13 is a front and top view of a roll ring;

FIG. 14 is a sectional front view of a "roll embodiment" produced by the "reverse process"; and FIG. 15 is a sectional front view of the "flat embodiment" produced by the "reverse process."

Figure 1:
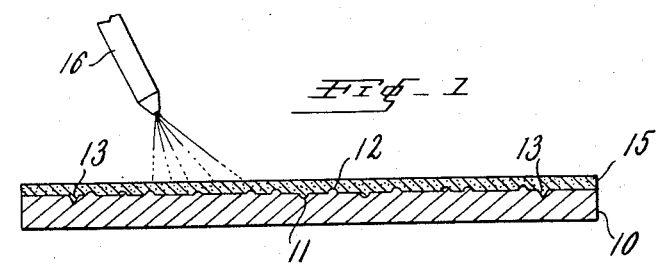
FIG. 1 is a front view showing the application of a first layer of porous metal on a "flat embodiment" mandrel.

Referring now to FIG. 1, the substantially flat mandrel 10 is suitably a plaster form having the desired surface texture and configuration of the surface of the molded product, i.e., it is a positive of the surface of the desired product. The texture of the mandrel 10 shown consists of a series of grooves 11 and ridges 12; however, choice of the texture and, for that matter, the configuration of the mandrel are matters of choice depending upon the specific product desired. The mandrel 10 is larger than the desired product, the desired product being no longer than the distance between the trim edges 13. These trim edges 13 are either grooves or ridges which define the periphery of the molding area and facilitate the removal of the final product from the mold.

A substantially flat first layer 15 of porous metal is applied over the top surface of the mandrel 10 in such a way as to conform to the surface of the mandrel 10. This first layer 15 of porous metal is very thin, preferably ranging in depth from about 1/16 inch to about 1/8 inch, and is made up of particles of metal lightly mechanically bonded together. It is very porous and will later serve as the molding surface of the vacuum forming mold. The first layer 15 of porous metal may be applied over the entire surface of the mandrel 10 in the form of molten metal by a flame sprayer 16 or by any of the other conventional techniques for forming porous metal layers, such as applying powdered metals or sintering, including the techniques and sprayers described in Modern Plastics, supra, or any of the following U.S. patents: 2,754,225, 2,772,920, 2,784,029, 2,868,667—provided that such technique does not cause undue weakening of the plaster form being used as a mandrel 10.

Although the use of a plastic form as the mandrel material affords certain advantages to be pointed out later, other conventional mandrel materials may be used such as wood, plastic, etc. Where needed, the mandrel 10 should be provided with a release coat to facilitate its subsequent removal from the first layer 15 of porous metal. A suitable release coat for a plaster form is a light coating of nylon deposited from a solution of nylon in alcohol, but other conventional release coats may also be used such as silicone releases, etc.

While aluminum is the preferred porous metal because of its low cost, ease of handling, relatively low temperature requirement for spraying, and the resultant lower weight of the end product, other metals such as low melting steels, bronze, copper, nickel and various alloys may be utilized. When the first layer is applied by the spraying of essentially molten metals, the flame sprayer 16 must be capable of heating materials to the proper temperature for such spraying.

Figure 2:
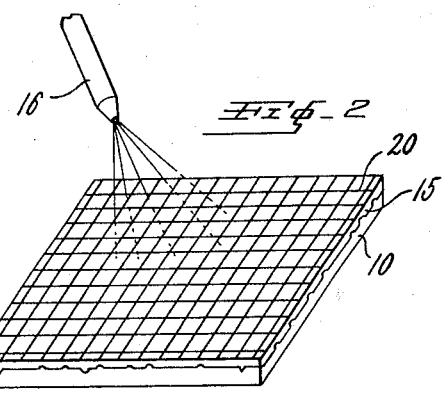
FIG. 2 is a perspective view showing the application of a second layer of porous metal on top of a fabric layer over the first porous metal layer.
Figure 3:
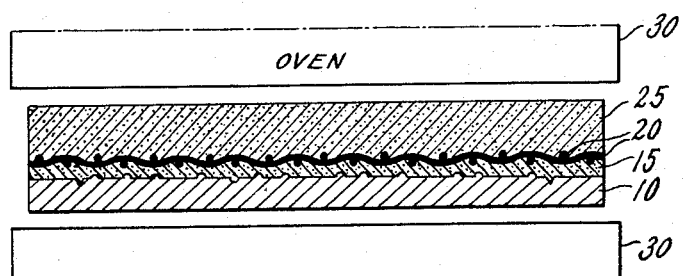
FIG. 3 is a sectional front view showing, prior to heating in the oven, the composite formed of the second porous metal layer, the fabric layer, the first layer and the mandrel.

Referring now to FIGS. 2 and 3, a fabric 20 is placed over and in contact with the entire surface of the first layer 15 of porous metal. The fabric 20 extends over and conforms to the entire top surface. Placement of the fabric can be facilitated by wetting the fabric so that it can be contoured to follow closely the surface. The fabric 20 is suitably an open weave combustible fabric, typically a net having approximately 2 to 8 warp and woof (fill) threads per inch, preferably 3 to 4 threads per inch. Each thread has a diameter of from approximately 1/8 to 1/64 inch, preferably about 1/32 inch. It should be recognized that these limitations are not critical, so long as the fabric is loosely woven.

There are few limitations on the combustible type fabrics used in this invention. Obviously, the fabrics used must be of the type which can be destroyed at temperatures below that which will adversely affect the structure of the porous metal. It is preferred that the material be the type which tends to char or burn readily so as to leave channel voids in the porous metal structure. Cotton, wool and vegetable fiber material, such as woven paper fabrics, are among the preferred materials while synthetic fibers such as nylon (polyamides) are not as desirable because (1) they tend to expand on exposure to the high temperature later required, thereby putting a strain on the mold, and (2) they tend to become fluid in such a way as to clog the walls of the passageways to be formed, thereby reducing the effectiveness of the vacuum system.

A substantially flat second layer 25 of porous metal is then applied, e.g., sprayed, over the entire surface of the fabric 20 and into the interstices thereof, so as to contact the portions of the first layer 15 not directly covered by the fabric 20. The second layer 25 of porous metal is sprayed to a thickness ranging in minimum thickness from about 3/16 to 1/4 inch. The result is a total sprayed metal layer (made up of layers 15 and 25) of approximately 1/4 to 3/8 inch minimum thickness having embedded therein an open weave net fabric layer.

Referring now to FIG. 3, the composite structure now consists of a plaster form 10, a first sprayed metal layer 15, an open weave combustible fabric 20, and a second sprayed porous metal layer 25. This composite structure is then placed in an oven 30 and heated at 600° to 750° F. for four hours. Naturally, the temperature and time of this heating step will vary with the particular materials which compose the composite structure. The exact duration and temperature will depend on what is necessary to accomplish the purposes of the heating step. For the particular composite structure described, the heating step accomplishes the following objectives: (a) the fabric is burned or reduced to easily removable ash within the porous mold structure leaving defined, open passageways; (b) the water of hydration present in the plaster is removed at this temperature, thereby weakening the plaster and facilitating later removal of the plaster from the first layer 15 of sprayed metal; and (c) the metal layers (without liquifying) become stress relieved, thereby eliminating internal stresses, and form a strong self-supporting structure around the passageways.

The composite structure is then removed from the oven and the plaster mold is broken away from the first layer 15 of porous metal to reveal a textured molding surface of ridges 43 and grooves 44.

Figure 4:
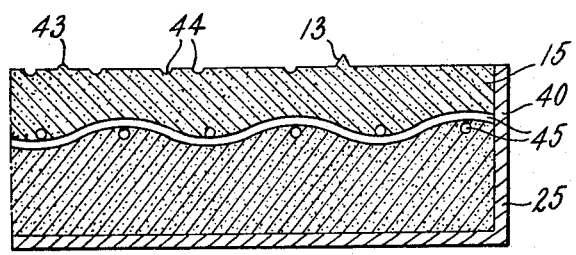
FIG. 4 is a sectional front view of a segment of the composite after removal of the mandrel and application of a sealer layer.

Referring now to FIG. 4, the remaining composite consists of the first layer 15, the second layer 25, and the channels 45 therebetween which were created by combustion of the fabric layer 20. The sides and the back surface of the remaining composite (i.e., the exposed outer areas of the remaining composite which were not in contact with the mandrel 10) are then sealed so as to render them air impermeable and to reinforce the remaining composite permitting it to be handled and used without damage thereto. In the present embodiment, sealing was accomplished by coating the sides and back surface of the remaining composite with a sealer layer 40 of epoxy resin and glass cloth; however, other conventional materials and techniques for sealing surfaces (strengthening them and rendering them air impermeable) may be used instead of, or in addition to, the layer 40 of epoxy resin and glass cloth.

The separation and juxtaposition of the porous metal layers 15, 25 is maintained both through their stress relieved contacts (at the locations corresponding to the formed interstices of the fabric) around the passageways 45 and through the supporting effect of the sealing layer 40 on their edges.

Referring now to FIG. 5, vacuum holes 51, called vac holes, are created along the periphery of the molding area (comprised of ridges 43 and grooves 44), but outside of the trim line formed by the trim edges 13, i.e., in the scrap area of any thermoplastic sheet formed over the mold surface. The vac holes 51 extend only through the first layer 15 and may be made by drilling, as with a 50 gauge wire drill, through the first layer 15 of porous metal or by other conventional means well known in the art. The vac holes 51 are used to obtain a quick initial pull down of the material to be molded (to speed up the molding process), but are not an essential part of the structure.

Referring now to FIGS. 5 and 6, a large bore and preferably thick-walled tube 50 is attached to the back or rear surface of the porous mold structure and makes an air-impermeable contact with the sealer layer 40. The large bore hole 60 extending through the second layer 25 is suitably made by drilling a 5/16 inch hole through the second porous metal layer, or by masking portions of the volume to be sprayed with metal to form the second layer. The large bore hole 60 communicates with the tube 50 and the channels 45 resulting from the combustion of the fabric layer 20. The large bore tube 50 is fitted with switching means (not shown) for connecting the large bore hole 60 alternately with a vacuum source (not shown) and a source of greater pressure (not shown)—preferably at least atmospheric—as desired for the molding operation and sheet removal operation, respectively. The large bore hole 60 and large bore tube 50 act as communicating means between the vacuum or pressure source and the channels; the first layer 15 of porous metal, in turn, acts as communicating means for vacuum or pressure between the channels and the top surface of the porous mold structure to prevent air entrapment and facilitate sheet removal. The large bore hole 60 directly communicates with several of the small vac holes 51 extending to the top surface of the porous mold structure and communicates with others indirectly by means of the channels. There may be a single large bore hole 60 and large bore tube 50 or there may be a plurality of them.

Referring to FIG. 6 in particular, a sheet 61, composed of unvulcanized rubber or a thermoplastic, heat-softenable plastic heated a few degrees beyond its softening point by heat lamps (not shown), is held within a rectangular holding clamp or frame 62 (say of metal). The frame 62 is lowered or the mold is raised to thereby cause the sheet 61 to contact the top or molding surface of the porous mold structure, the molding surface having been preheated by heat lamps (not shown) to about 140° F. to prevent premature cooling of the sheet 61 before molding. The vacuum source creates a vacuum immediately above the molding surface so as to pull the hot plastic sheet 61 into close contact with the molding surface, first contact occurring around the outside edge of the trim line formed by the trim edges 13 as this area is closest to the direct communication of the vacuum acting directly on the sheet 61 through the vac holes 51. This seals the hot plastic sheet 61 around the top surface periphery of the porous mold structure, thereby causing the vacuum then to pull the hot plastic sheet 61 down to the top surface of the molding area within the trim line of the mold structure. The vacuum action takes place through the channels and, in turn, produces a vacuum at the surface of the top layer 15 of porous metal, thereby forcing the hot plastic sheet 61 into intimate contact with the top surface of the first layer 15 of porous metal. The vac holes 51 are therefore useful in causing the original seal of the plastic sheet 61 to the top surface of the first layer 15 of porous metal, so that the vacuum action through the first layer 15 is especially efficacious. If desired, the vac holes 51 may be connected to a vacuum source distinct and separate from the vacuum source acting through the passageways.

Removal of the molded plastic sheet after it has cooled below the softening point (usually within a matter of seconds) or vulcanized (cured) to hold the texture of the mold is facilitated by the existence of the trim edges 13 (which enable a lifting blade to be easily inserted under the sheet) and may be further facilitated by disconnecting the large bore tube 50 from the vacuum sources and either venting it to the atmosphere or connecting it to a pressure source to assist in displacement of the plastic sheet from the top porous metal layer 15 of the mold.

Depending upon the nature of the material to be molded and the texture pattern formed by the grooves 11 and ridges 12 of the mandrel 10, the molded product may be used as a mat for automobiles, a cushion surface, a section of the surface for luggage etc. For the sake of simplicity, the surface of the porous mold structure illustrated in the drawings is relatively flat, but for specific applications it may be of any desired form and configuration.

It should be noted that although second layer 25 is preferably composed of porous metal, like the first porous metal layer 15, and although the fabric layer 20 preferably is composed of a lattice of fibers so that the channels resulting from combustion of the fibers are interconnecting as when the fibers of the fabric layer are all substantially parallel), the second layer 25 may be non-porous and/or non-metallic and some or all of the channels 45 may be other than directly interconnecting.

As noted above, it is possible to have a second layer 25 which is composed not of a porous metal, but rather either of a non-porous metal or of a resin of high distortion temperature, such as an epoxy resin, which will not itself burn or distort during combustion of the fabric layer 20, the fibers of which have a low ignition point relative to the distortion temperature of the resin. However, if the second layer 25 is composed of an air-impermeable (non-porous) material, be it metal or high distortion temperature resin, it is essential that the second layer 25 does not completely encapsulate the fibers of the fabric layer 20 or the passageways formed by combustion of the fibers will not communicate with the molding surfaces of the first layer 15 of porous metal. Such a 100% encapsulation is easily avoided by maintaining contact between the fibers and the first layer 15 of porous metal during application of the non-porous second layer 25. When the second layer 25 is composed of such an air-impermeable non-porous material, it can serve both as a second layer 25 and as the portion of the sealer layer 40 which, in the other embodiments, surrounds the exposed outer areas of the second layer 25. It should be noted, however, that a non-porous second layer 25 may interfere with the vacuum draw of certain channels, e.g., those formed at the location of the alternate (lower) warp threads, which it partially surrounds, thereby causing irregularities in the vacuum on the top surface of the porous mold structure. The porous mold structure having two porous metal layers is therefore prepared for most, but not all, applications as it allows any portion (top or bottom) of any channel to suck air from the mold interior so as to produce a uniformly distributed vacuum of constant strength over the molding surface.

As noted above, although normally and preferably the passageways formed by the woof (fill) and warp threads will be interconnecting, due to the physical closeness of the warp threads to the woof threads, so that a single vacuum source may be conveniently utilized, it is also possible to have the passageways formed by each warp thread and the passageway formed by each woof (fill) thread integral and unconnected to other passageways as by combustion of a very loosely woven fabric. Similarly, it is possible to replace the fabric layer 20 with a plurality of non-woven or parallel combustible fibers or strings, so that the passageways formed by the combustion of the fiber do not interconnect. In the non-interconnecting embodimens, appropriate means must be provided for connecting each distinct passageway with a vacuum source, as by providing for each passageway a separate large bore hole 60 and vacuum-connected large bore tube 50. However, to insure application of a uniform pressure or vacuum over the entire molding area, it is preferred that the passageways be interconnected. The greater the number of direct interconnections between channels, the greater is the likelihood of each segment or length of each channel having the same pressure therein.

Referring now to FIG. 7, in order to construct a preferred embodiment, the mandrel 10 used is typically a reinforced, substantially cylindrical plaster shell of rigid form having an interior surface with a positive of the desired texture of ridges 12 and grooves 11 on it. Such a mandrel 10 may be formed by casting around an existing embossing roll a continuous seamless cylindrical sleeve of an elastic material capable of capturing and retaining the desired texture of the roll, e.g., vinyl plastisol, silicone and polysulfide rubber, etc. (The continuous cylindrical sleeve may also be made flat and later seamed to form a cylinder where the design or texture lends itself to incorporating the seam as part of the design or later editing it out.) The sleeve is then removed from the embossing roll and pulled over a disposable frame with the textured side facing outwards. A reinforced plaster shell may then be poured over the textured surface to obtain a rigid form having the interior surface with the desired texture. The disposable frame and the plastisol (or other) sleeve are then removed from the interior of the plaster.

The inner surface of the hollow plaster mandrel 10 is then sprayed with metal, utilizing a flame sprayer 16, to form a substantially cylindrical first layer 15 of porous metal preferably approximately 1/16 inch thick. Referring now to FIG. 8, combustible fibers 20 (preferably of from 1/32 to 1/16 inch in diameter) are then stretched longitudinally on the inner surface of the first layer 15 parallel to the mandrel axis. The fibers 20 lie approximately 1/4 inch apart and may be held down to the first layer 15 with a small amount of combustible cement (not shown), such as an unloaded rubber cement, an animal glue or a starch solution, which degrades or tends to disintegrate at the stress relieving temperatures used. Either or both ends of the mandrel 10 are outfitted with prefabricated annular roll ring(s) 130 having extending therethrough roll ring channels or holes 131 (as shown in FIG. 13) aligned along the same longitudinal lines as the fibers 20. Each hole has a slightly greater diameter than that of the fibers. The ends 81 of the fibers 20 are then pulled through roll ring channels or holes 131 and knotted or fastened to each other, there being one hole for each fiber end 81.

Referring now to FIG. 9, a substantially cylindrical second layer 25 of porous metal (preferably, though not necessarily, porous) is applied, as by a flame sprayer 16, over and between the fibers so as to contact the exposed portions of the first layer 15 (the portions not covered by the fibers 20) and the inner sides of the roll ring(s) 130 until the combined minimum thickness of the first and second layers 15, 25 is approximately 1/2 inch. The entire assembly is then heated in an oven 30 to approximately 650° F. to cause (a) the plaster of the mandrel 10 to lose its water of hydration (to facilitate later removal thereof from the first layer 15), (b) the sprayed metal in the first and second layers 15, 25 to anneal (thereby removing stresses) and (c) the combustible fibers 20 to char or burn out (thereby leaving small 1/16 inch longitudinal channels 45 between the first and second layers). The assembly is then removed from the oven 30, and the plaster of the mandrel 10 is removed from the molding surface of the first layer 15 comprising ridges 43 and grooves 44. The remaining composite of first and second layers 15, 25 and roll ring(s) 130 is slightly warmed to facilitate its placement over a non-porous, rotatable roll shaft 100 of suitable diameter which acts as an air-impermeable sealer for the second layer 25 (see FIGS. 10–11). If only one end of the mold has been sealed by the use of a non-porous roll ring 130, the other end is sealed with an air-impermeable sealer layer.

Referring now to FIGS. 10–13, the smooth inner face 121 of a non-porous ring commutator 120 is snugly fitted in a face-to-face relationship against the smoothed outer face 135 of the roll ring 130. The roll ring 130 engages one end of the roll for rotation therewith; the outer commutator ring 120 is stationary and fixedly connected to base 112. The inner face 121 of commutator ring 120 has two separate recessed grooves 122, 123. Recess groove 122 is attached to a vacuum source (not shown) by tube 102; while recess groove 123 is attached to a source of lesser vacuum (not shown) by tube 103 (e.g. tube 103 is vented to the atmosphere or is connected to a source of pressure greater than atmospheric). Recess grooves 122, 123 are located for communication with the roll ring channels, i.e., holes 131, which, in turn, communicate with the channels 45 formed by the combustion of the fibers. The roll embodiment so prepared and assembled, as in FIG. 11, will emboss hot thermoplastic material 61 guided by rollers 105 over that portion of its surface to which a vacuum is applied via the internal channels during the vacuum phase, and the thermoplastic material embossed with ridges 46 and grooves 47 will then be removed from the embossing surface of the roll during the venting or pressure phase. The contact times under vacuum or pressure (venting) can be varied by changing the length of the commutator ring recess grooves 122, 123.

In the operation of the roll embodiment of FIG. 11, the fixed commutator ring 120 is positioned in a face-to-face, slidable air-tight manner against the rotating roll ring 130. At any given instant during the rotation of the roll shaft 100, certain of the holes 131 will be lined up with the recess groove 122 and, therefore, vacuum will be applied to sections of the roll connecting with those particular channels 45 aligned with said holes 131, thereby assisting the embossing. Upon further rotation of the roll, these channels 45 and and their corresponding holes 131 will become lined up with the recess groove 123 and will be pressurized or vented to the atmosphere, thereby facilitating stripping of the embossed material from those sections of the roll. To summarize, in order to avoid the difficulty involved in stripping the embossed material from the roll when vacuum is applied to all portions of the roll during a complete 360° rotation, the vacuum is applied to any section of the porous metal vacuum embossing roll only through approximately 270° or some analogous portion of its rotation and pressure or venting is applied during the remainder of the rotation cycle. This system of roll ring 130 and commutator ring 120 in the roll embodiment therefore corresponds to the switching mechanism in the flat embodiment first described which connects the large bore tube 50 alternately to either a vacuum source or a pressure (or venting) source. It is important to note that, whereas the passageways formed in the flat embodiment (by combustion of a woven or non-woven fabric) may or may not be interconnecting, the passageways formed in the roll embodiment (by combustion of parallel longitudinal fibers) are preferably not interconnecting as it is desired to apply, at any given instant, pressure (or venting) to one set of these channels and vacuum to another set of channels.

Because of the difficulties occasionally encountered in tightly fitting the second layer 25 of the "roll embodiment" over the non-porous, rotatable roll shaft 100, in certain situations it has been found desirable to use a spider-type shaft to avoid the need for boring out the inner surface of the second layer 25 to insure an exact fit between such inner surface and the outer wall or surface of the rotatable roll shaft 100. The spider-type shaft is a rotatable roll shaft having a diameter considerably smaller than the inner surface of the second layer 25 and radial or "spider" arms extending radially therefrom. Because such a spider-type shaft would not be in complete air-excluding contact with the inner surface of the second layer 25, it is necessary to coat the inner surface of the second layer 25 with an air-impermeable sealer layer corresponding to air-impermeable sealer layer 40. As can easily be envisioned, it is a simple matter to insert the radially armed shaft into the hollow formed by the inner surface of the sealer layer on the second layer 25 and then anchor the outer tips of the radial arms to points on the inner surface of the air-impermeable sealer layer with a suitable cement, e.g., epoxy resin. If desired, the radial arms may be hollow and in sufficient number so that each single radial arm connects with a corresponding single longitudinal channel or passageway. In this case, each single hollow radial arm may be caused (as by the boring of appropriately located holes through the second layer) to communicate at the outer tip directly with the corresponding single open passageway and, at another point along its length, with a commutator ring of the type earlier described and shown in FIGS. 12 and 13 of the drawings. In this last variant, therefore, the pressures and vacuums are distributed by the commutator system to the appropriate longitudinal hollow passageways by means of the hollow radial arms rather than through the roll rings 130, which may therefore be dispensed with.

In any embodiment, cooling means may be provided to accelerate the cooling and hardening of the hot plastic material after molding. Any conventional cooling means may be used, either external or internal to the mold. For internal cooling, tubes for the conduction of water or forced air drafts may be located, for instance, in the second layer 25 of any embodiment or in the shaft 100 of the roll embodiment.

If desired, in any embodiment, the surface of the plaster mandrel 10 contacting the first layer 15 may be smooth, i.e., without any grooves 11 or ridges 12, so that the molding area produced is similarly smooth. After the oven heating and removal of the mandrel 10, the first layer 15 may be engraved with the desired texture by standard engraving techniques. If the engraving solution plugs the porosity of the first layer 15, then the molding surface thereof may be blasted with water and/or slightly etched with solvents to recapture the porosity.

For any embodiment, the process for building the mold may be reversed. For the "reverse" roll embodiment shown in FIG. 14, the outer surface of a mandrel which may be a rotatable shaft 100 (equipped with journals and a water cooled interior) is blasted to receive and hold metal. The second layer 25A of metal is then applied, e.g., sprayed onto the blasted surface to a thickness of ⅛ inch. Either the shaft 100 or the second metal layer 25A is non-porous (air-impermeable). Longitudinal fibers 20 are fixed to the surface of the second layer 25A with a suitable combustible cement (not shown) such as animal glue or a starch solution. Roll rings 130 are fixed to the ends of the second layer 25A over the shaft 100 and the ends of the fibers 20 are fastened through holes 131. The first layer 15A of porous metal is sprayed over the fibers 20, the exposed areas of the second layer 25A of porous metal, and the roll rings 130 to obtain a completely smooth surface (or one that can be so smoothed) having approximately ⅟₁₆ inch of sprayed metal over the fibers. The whole assembly is then heated at 650° F. in an oven 30 to anneal the metal layers 15A, 25A and also burn or char out the fibers 20. The outer or molding surface is next engraved with a negative of the desired texture of grooves 44 and ridges 43 by standard engraving technique methods, the molding surface being water-blasted and/or slightly etched to re-open the first layer 15A if the engraving solution plugs the porosity of the metal. The assembly is then equipped with a commutator ring 120, which is attached to fixed base 112 and has separate recess grooves 122, 123 communicating, respectively, with vacuum and pressure sources by means of tubes 102, 103. The roll is then ready for use as described above.

Similarly, the procedure for the formation of the flat embodiment may be reversed. Referring now to FIG. 15, the second layer 25A of porous metal is sprayed over a non-porous support 40A corresponding to the sealer layer 40 (FIG. 6) at the base of the mold. (Alternatively, a non-porous second metal layer may be applied over a release-treated removable surface.) Woven or non woven fabric is applied over the second layer 25A. The first layer 15A is then sprayed over the fabric and exposed portions of the second layer 25A. The thickness of the first layer 15A is appropriately adjusted to allow for any diminution thereof due to the subsequent texturing by standard engraving techniques. After heating the above composite at about 650° F., a sealer layer 40B (corresponding to the sealer layer 40 (FIG. 6) at the edges of the mold) is applied around the edges of the first and second layers 15A, 25A. The vac holes 51 and large bore hole 60 are drilled, and large bore tube 50 is inserted and connected to vacuum and pressure sources. After engraving of the first layer 15A with a negative of the desired texture of grooves 44 and ridges 43, the mold is then ready for use as described above.

Of course, many modifications of the specific processes and devices described above may now become apparent to those skilled in the art. For instance, the use of a "flat type" porous vacuum mold to replace at least one part, say the lower half, of a closed or multipiece molding system (of the type conventionally used in the production of latex foam rubber products, such as cushions and bucket seats for automobiles) produces a novel molding system having several distinct advantages over the conventional closed molding system composed of non-porous materials. Because the pores of the porous metal molding surface are finely grained, rubber and chemical plate-out cannot penetrate or clog them, yet gases and moisture can be extracted from the closed molding cavity by them so as to thereby (1) avoid air traps which cause incomplete fill-out of the mold, (2) ensure conformity of the molding compound to the molding cavity because the vacuum on the inner surfaces of the cavity prevents "pull-away" of the compound therefrom, (3) allow faster cures because steam introduced into the cavity will be pulled through the compound and out of the cavity by the vacuum under the molding surface, and (4) eliminate the need for overflow or vacuuming vents on the mold so that products may be molded without flash, overflow or sprue formation (thereby eliminating the usual waste of molding compound as well as the usual need for trimming). Consequently, the scope of the instant invention should not be considered as defined by the foregoing disclosure, but by the appended claims.

Having thus described our invention, what we claim and desire to protect by Letters Patent is:

1. The method of making a shape-imparting device comprising: fashioning a shape-imparting surface on a layer of porous metal; depositing a plurality of fibers on a surface other than said shape-imparting surface of said layer of porous metal; depositing a supporting layer upon the same surface of said layer of porous metal whereby said supporting layer becomes substantially bonded to said layer of porous metal; rendering all exterior surfaces of said device except said shape-imparting surface air-impervious; and heating said device to disintegrate said fibers, leaving a network of passage where said fibers had been.

2. The method of making a mold for vacuum-forming materials comprising: flame-spraying a layer of porous metal upon an object having the shape desired to be reproduced; depositing a layer of open-weave fabric upon said layer of porous metal; flame-spraying another layer of metal on said layer of fabric whereby the two said layers of sprayed metal become firmly bonded together in the interstices of said fabric; rendering all exterior surfaces of said mold except the shape-imparting surface air-impervious; and heating the mold to disintegrate said fabric to leave a network of passages.

3. The method of making a mold for vacuum-forming impressionable materials comprising: covering a plaster mandrel having the shape desired to be reproduced with a porous layer of sprayed metal not greater than one-eighth (⅛) inch thick; covering said porous layer with a layer of combustible open-weave fabric containing two to eight warp and pick threads, respectively, per inch; depositing another layer of sprayed metal upon said fabric layer whereby the two layers of metal are substantially bonded together in the interstices between said fabric; applying a sealer material to all exterior surfaces of said mold except the shape-imparting surface to render said surfaces air-impervious; heating the mold to disintegrate said fabric; and removing said plaster mandrel.

References Cited by the Examiner

UNITED STATES PATENTS

| | | | |
|---|---|---|---|
| 1,592,536 | 7/1926 | O'Neill | 18—47 |
| 2,178,633 | 11/1939 | Hooper | 29—423 |
| 2,932,884 | 4/1960 | Lyon | 29—423 |
| 2,944,338 | 7/1960 | Craig | 29—423 |
| 3,010,869 | 11/1961 | Esteve | 18—47 X |
| 3,052,015 | 9/1962 | Kerstetter | 29—195 |
| 3,057,049 | 10/1962 | Pflumm et al. | 29—195 |

JOHN F. CAMPBELL, *Primary Examiner.*

THOMAS H. EAGER, *Examiner.*